US012654244B2

(12) United States Patent (10) Patent No.: US 12,654,244 B2
Zimmermann (45) Date of Patent: Jun. 16, 2026

(54) DEVICE AND METHOD FOR PRODUCING BEVELS ON TOOTH FLANKS OF GEARWHEELS

(71) Applicant: Profilator GmbH & Co. KG, Wuppertal (DE)

(72) Inventor: Karsten Zimmermann, Wuppertal (DE)

(73) Assignee: Profilator GmbH & Co. KG, Wuppertal (DE)

( * ) Notice: Subject to any disclaimer, the term of this patent is extended or adjusted under 35 U.S.C. 154(b) by 657 days.

(21) Appl. No.: 18/005,400

(22) PCT Filed: Jul. 8, 2021

(86) PCT No.: PCT/EP2021/069050
§ 371 (c)(1),
(2) Date: Jan. 13, 2023

(87) PCT Pub. No.: WO2022/138068
PCT Pub. Date: Jan. 20, 2022

(65) Prior Publication Data
US 2023/0302558 A1 Sep. 28, 2023

(30) Foreign Application Priority Data

Jul. 13, 2020 (DE) ..................... 10 2020 118 384.4

(51) Int. Cl.
*B23F 21/12* (2006.01)
*B23C 5/20* (2006.01)
*B23F 19/10* (2006.01)

(52) U.S. Cl.
CPC ............ *B23F 21/126* (2013.01); *B23C 5/202* (2013.01); *B23F 19/102* (2013.01)

(58) Field of Classification Search
CPC ...... B23C 2200/0433; B23C 2200/125; B23C 2200/367; B23C 2210/204;
(Continued)

(56) References Cited

U.S. PATENT DOCUMENTS

2013/0259591 A1* 10/2013 Durr ....................... B23F 9/105
409/26
2015/0328704 A1 11/2015 Otani et al.
(Continued)

FOREIGN PATENT DOCUMENTS

DE 2157619 B1 10/1972
DE 10002188 A1 7/2001
(Continued)

OTHER PUBLICATIONS

International Search Report and Written Opinion of the International Searching Authority; Application No. PCT/EP2021/069050; Completed: Sep. 21, 2021; Mailing Date: Oct. 1, 2021; 20 Pages.

*Primary Examiner* — Nicole N Ramos
(74) *Attorney, Agent, or Firm* — Whitmyer IP Group LLC

(57) ABSTRACT

A method for producing a bevel on the edge defined by an end face of a gearwheel and the flanks of the teeth of the gearwheel adjacent thereto, with a cutting tool which at least includes a cutting edge. The invention further relates to a cutting tool for performing the method and a cutting insert, a device for performing the method and a control program. It is essential that the cutting edge processes only one processing section of the edge during each revolution of the cutting tool.

10 Claims, 9 Drawing Sheets

(58) Field of Classification Search
CPC .......... B23C 2210/282; B23C 2220/16; B23C
5/109; B23C 5/202; B23F 19/102; B23F
21/126; B23F 21/128; B23F 21/206;
B23F 23/006
See application file for complete search history.

(56) References Cited

U.S. PATENT DOCUMENTS

| | | | | |
|---|---|---|---|---|
| 2016/0089737 A1* | 3/2016 | Zeller | ................. | B23F 23/1218 |
| | | | | 409/8 |
| 2017/0173713 A1 | 6/2017 | Thijssen et al. | | |
| 2018/0071840 A1 | 3/2018 | Suzuki et al. | | |
| 2018/0297134 A1* | 10/2018 | Yoon | ..................... | B23F 19/107 |
| 2018/0345392 A1* | 12/2018 | Weixler | ............... | B23F 21/005 |
| 2019/0224767 A1* | 7/2019 | Ribbeck | ................. | B23F 23/006 |
| 2019/0247941 A1* | 8/2019 | Leicht | ..................... | B23F 19/10 |
| 2021/0069808 A1* | 3/2021 | Zimmermann | ......... | B23F 5/163 |

FOREIGN PATENT DOCUMENTS

| | | | | | |
|---|---|---|---|---|---|
| DE | 10116259 | A1 | 6/2002 | | |
| DE | 10258594 | A1 | 7/2003 | | |
| DE | 102013012797 | A1 | 2/2015 | | |
| DE | 102017105032 | A1 | 9/2018 | | |
| DE | 102019110481 | A1 | 10/2020 | | |
| EP | 1035935 | A1 | 9/2000 | | |
| EP | 2846954 | A1 | 3/2015 | | |
| WO | WO-0139916 | A1 * | 6/2001 | ............ | B23F 23/006 |
| WO | 2004078395 | A1 | 9/2004 | | |
| WO | 2007065945 | A1 | 6/2007 | | |
| WO | 2008018062 | A2 | 2/2008 | | |
| WO | 2015185186 | A1 | 12/2015 | | |
| WO | 2017125553 | A1 | 7/2017 | | |

* cited by examiner

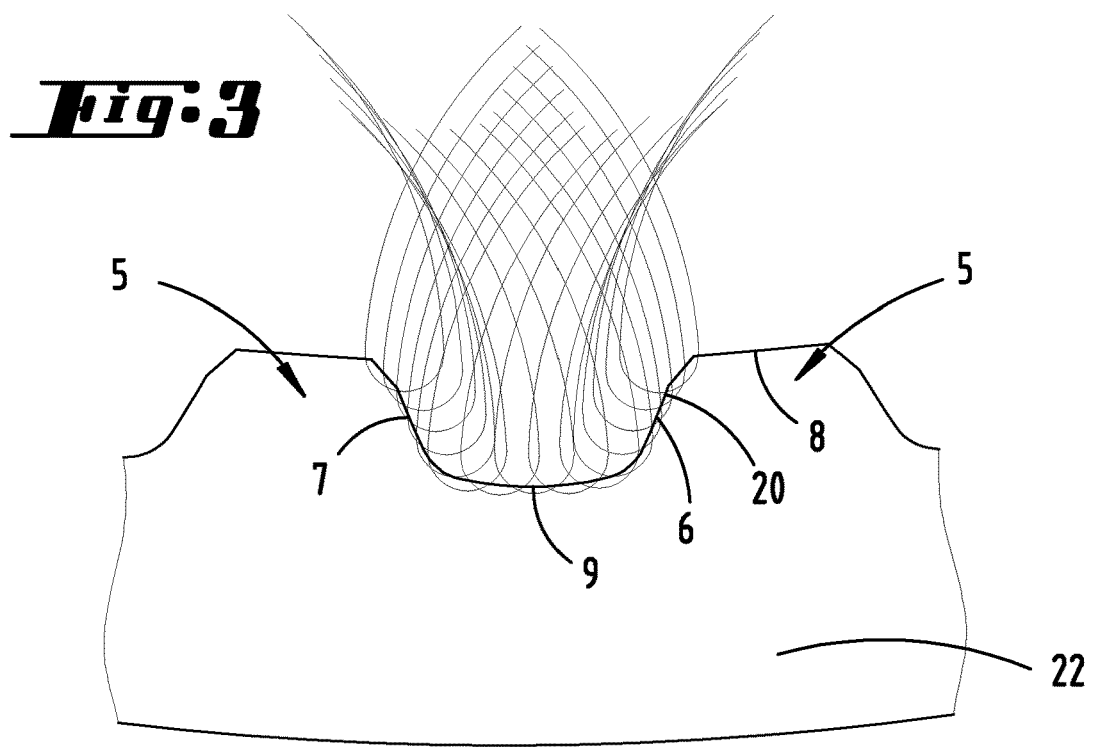
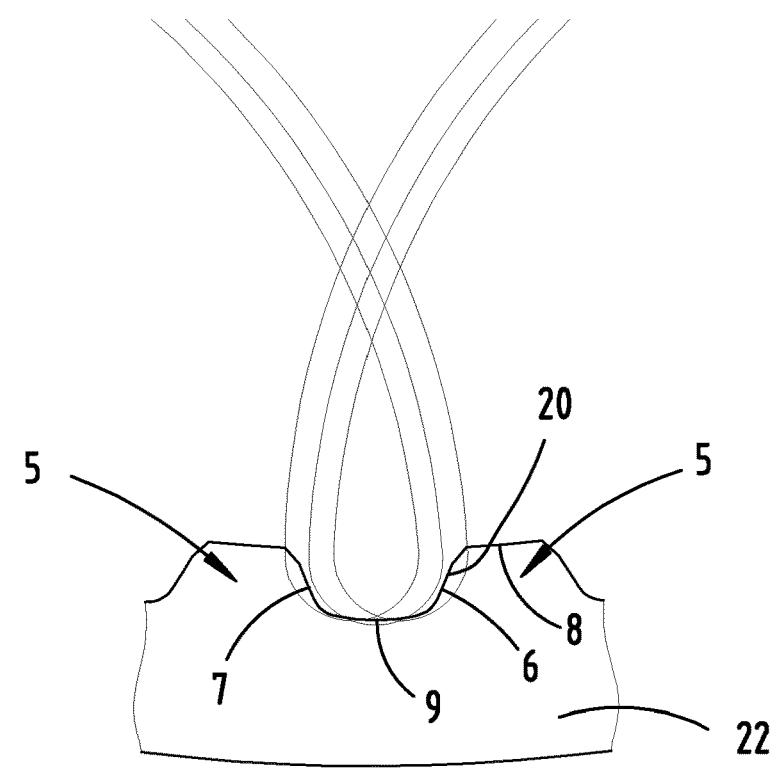

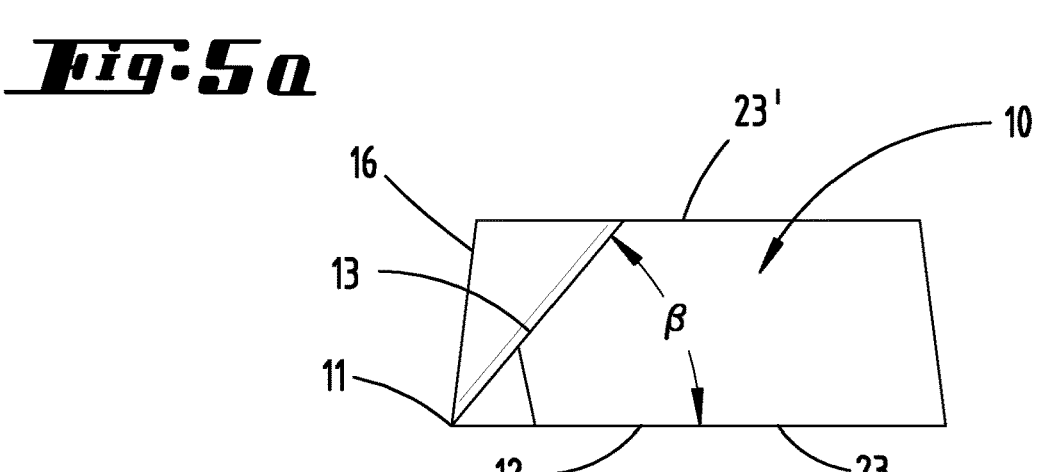
Fig·5
Fig·5a

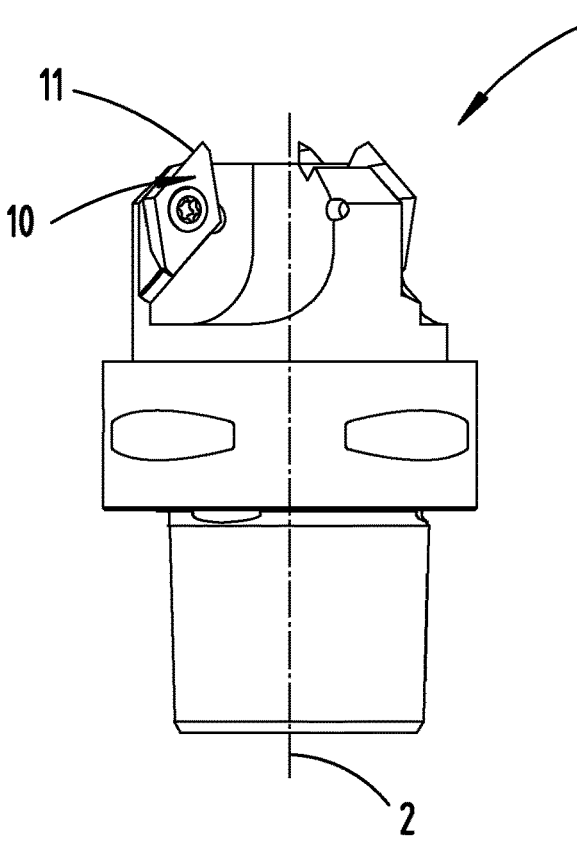
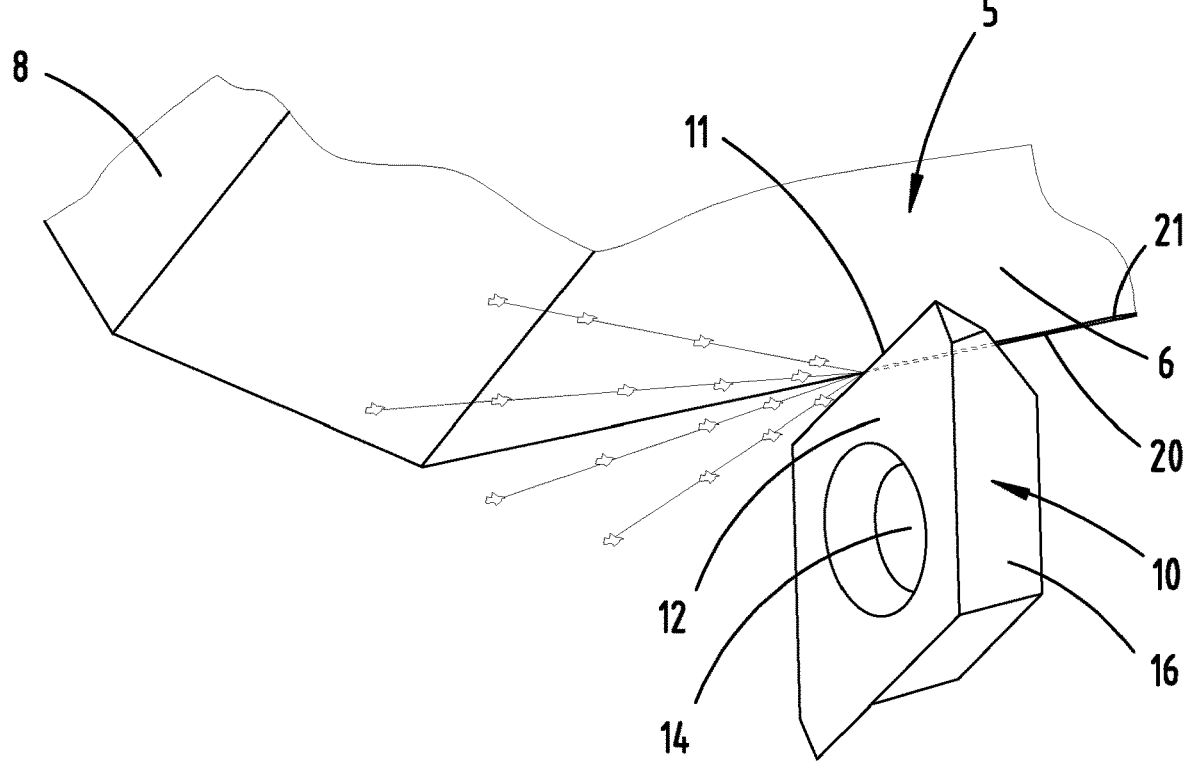

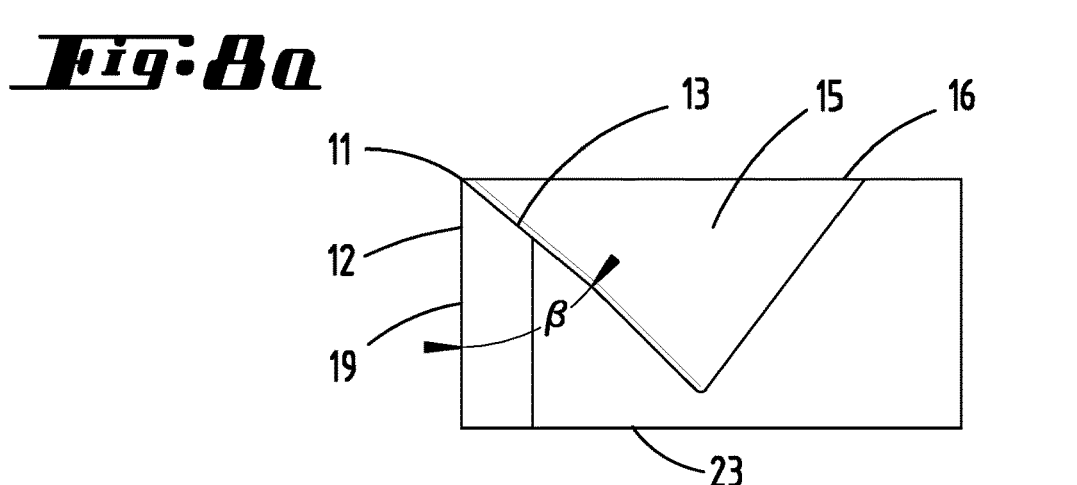
*Fig·8*
*Fig·8a*

DEVICE AND METHOD FOR PRODUCING BEVELS ON TOOTH FLANKS OF GEARWHEELS

TECHNICAL FIELD

The invention relates to a method for producing a bevel on the edge defined by an end face of a gearwheel and the flanks of the teeth of the gearwheel adjacent thereto, with a cutting tool which at least comprises a cutting edge, wherein the gearwheel and the cutting tool are each driven in a rotary manner about a rotation axis in a predefined speed ratio, in such a way that the at least one cutting edge moves along a section of the edge removing material in an involute manner and a cutting insert for use in the method, a device for performing the method and a control program.

BACKGROUND

WO2015/185 186 describes a method for the processing of a workpiece in the gear skiving process using a combination tool. The combination tool has cutting teeth with cutting edges, with which deburring can be carried out by tool edges, wherein the axes of the tool and workpiece are aligned in parallel.

DE 2 157 619 discloses a device and a method, with which a gearwheel-shaped cutting tool is used for the deburring or breaking of the edges at the tooth ends of the teeth of gearwheels. The tool is driven in a rotary manner in a fixed speed ratio to the gearwheel-shaped workpiece, in such a way that cutting edges of the cutting tool are operated in a material-removing manner at the edges, at which the tooth flanks of the teeth adjoin an end face of the gearwheel. Bevels are thereby produced on the edges. The axes of the workpiece and tool run skewed to one another, so that the cutting edges engage in a paring manner with the workpiece.

A method for the material-removing processing of gearwheels, wherein the axes of the workpiece and tool run skewed to one another, is previously known moreover from DE 10 2013 012 797 A1.

A method for the deburring of gearwheels with a deburring wheel, which can be driven in a rotary manner about a rotation axis, which runs parallel to the tool rotation axis, is described in DE 102 58 594 A1.

DE 100 02 188 A1 and DE 101 16 259 A1 describe methods for producing undercuts in tooth flanks of gearwheels. A cutting tool comprises a plurality of cutting edges, which are arranged in a uniform peripheral distribution about the rotation axis of the tool. The cutting edges run parallel to the rotation axis of the tool. The latter runs parallel to the rotation axis of the workpiece. By a change in the phase position, a plurality of processing steps of the tooth flank are successively processed, wherein the processing of the tooth flanks lying opposite one another takes place in successive processing steps, in which the processing direction always runs from the tooth tip to the tooth base.

DE 10 2017 105 032 A1 describes a tool holder for holding diamond-shaped cutting inserts.

DE 10 2019 110 481 A1 describes a device for the production of toothed workpieces, in particular sliding sleeves, wherein a tool head is used which carries cutting inserts.

SUMMARY

The problem underlying the invention is to develop the generic methods so that they can be used advantageously, and to specify a tool which can be used for this and a device which can be used for this.

The problem is solved by the invention specified in the claims, wherein the sub-claims not only represent advantageous developments of the invention specified in the coordinated claims, but also represent independent solutions to the problem.

In the first place and essentially, it is proposed that the cutting edge processes only one processing section of the edge with each revolution of the cutting tool. The edge of the tooth of a work gear that is to be deburred is thus processed in sections. The edge of the teeth are processed successively at different points. According to a first aspect of the invention, this can take place by the fact that the cutting edges are not arranged in a uniform angular distribution about the tool rotation axis. The cutting edges or the cutting inserts carrying the cutting edges are arranged angularly offset to one another, in such a way that, with a uniform synchronous rotation of the work gear and the tool, they engage at different points of the tooth of the work gear and in particular of the tooth edge of the work gear that is to be deburred. During a revolution of the work gear or the tool, the cutting edges engage not only that different points of the teeth designed the same as one another. The cutting edges also engage at teeth of the work gear different from one another. During the processing of the tooth edges, therefore, teeth different from one another are first processed at points different from one another before, after a plurality of revolutions of the work gear and the tool, all the teeth have been processed at all points. In this aspect of the invention, the phase position of the rotational movement of the work gear and the rotational movement of the tool is preferably not changed. The cutting edges each have different angular distances from the adjacent cutting edges. According to a second aspect of the invention, the phase position of the rotational movement of the work gear and the tool is on the contrary changed. It is further proposed that the rotation axes of the gearwheel and the cutting tool run parallel to one another. A device according to the invention can comprise a drive device, which comprises two spindles. A tool spindle can carry the cutting tool. A workpiece spindle can carry the workpiece formed by the gearwheel. A device constituted in this way is used in the prior art for the production of undercuts. Unlike in the method for the production of undercuts, however, the device according to the invention does not comprise or the method according to the invention does not use cutting edges extending parallel to the tool axis. The cutting edges can, as previously known from further prior art, extend at least in sections in radial planes, which are characterised in that the tool rotation axis lies in a radial plane. The extension direction of the cutting edge not only has a directional component parallel to the tool rotation axis. According to the invention, the extension direction of the cutting edge of at least one section of the cutting edge on the contrary also has a directional component running obliquely to the tool rotation axis, i.e. a component running in a radial direction, in particular in the radial plane. The cutting edge can thus run at least in sections obliquely to the rotation axis of the tool. The angle between the rotation axis of the tool and the cutting edge or region of the cutting edge is preferably less than 80°, 70° or 60°. It can also be less than 50°. The angle is preferably greater than 20°, 30° or 40°. It preferably lies between 60° and 30° or 50° and 40°. It can amount to 45°. According to the invention, only the edge is processed with the cutting edge at which a tooth flank of the gearwheel adjoins an end face of the gearwheel. The processing of this edge can take place in a plurality of successive processing steps. Only one processing section of the edge is processed in each processing step. In order to change the position of the processing section, the phase position between the rotational movement of the tool and the rotational movement of the workpiece can be changed. However, the axial position of the tool rotation axis and of the workpiece rotation axis can be changed whilst their parallelism is retained. With the method according to the invention and the device according to the invention, both internally toothed and also externally toothed workpieces can be deburred. The radial distance of the cutting edges to the rotation axis of the tool is preferably smaller than the radial distance of the teeth to the rotation axis of the workpiece. During processing, the cutting edge has an involute trajectory with respect to the workpiece. According to a variant of the invention, the edges of two opposite-lying tooth flanks can be deburred without changing the rotation direction of the workpiece or tool rotation axis after one another. During the processing of a first edge of the two tooth flanks, the processing takes place from the tooth tip to the tooth base. During the processing of the second edge of the two tooth flanks, the processing takes place from the tooth base to the tooth tip. According to the first variant of the invention, the two opposite-lying tooth flanks of the teeth are processed by cutting edges different from one another, which are each constituted by a cutting insert. A carrier carrying the cutting inserts thus carries first cutting inserts which process first tooth flanks of the teeth during the same revolution of the tool, and second tooth inserts which process the second tooth flanks of the teeth during the same revolution of the tool, wherein the first tooth flanks and the second flanks lie opposite one another. The carrier preferably carries third cutting inserts, which process third tooth flank sections of the teeth during the same revolution of the tool, the carrier preferably carrying further fourth cutting inserts, which process fourth tooth flank sections during the same revolution of the tool and also the carrier preferably carries fifth tooth inserts which process fifth tooth flank sections of the teeth during the same revolution of the tool. Wherein the tooth flank sections constitute sections of the opposite-lying tooth flanks and/or of the tooth base. According to a second variant of the invention, provision can be made such that the entire edge assigned to a first tooth flank is processed in a first single processing phase and the entire edge assigned to a second tooth flank is processed in a second single processing phase. The edge assigned to the tooth base can be processed in an intermediate phase. The cutting edge is preferably constituted by a cutting insert and particularly preferably by an indexable cutting insert. The cutting edge is defined by a cutting face adjoined by a tool flank. The tool flank and the cutting face can each run in a plane. The rake angle between the tool flank and the cutting face can be less than 90°, 80°, 60° or 50°. The rake angle is preferably greater than 0°, 10°, 30° or 40°. The rake angle can amount to between 30° and 60°, it can amount to 50°. The cutting edge can be constituted by an edge section of a base body. The cutting edge can be the extension of a marginal edge of the base body. In a variant of the invention, the cutting edge is constituted by a cut-free corner section of a base body. The base body can comprise two wide side faces running parallel to one another. In the processing, the edge to be provided with a bevel can dip through the cut-free corner section. The wide side faces can have a diamond-shaped cross section. The cutting edges preferably lie in the corner section of the base body. The side faces of the base body have an angle to the wide side faces which is greater than the rake angle. The transition angle between the wide side face and the side face can amount to at least 70° or 80°. In a preferred variant, the tool flank is constituted by the cut-free corner section. The cut-free corner section can constitute a bevel. It can however also be formed by an angular notch. The material of the cutting insert can be hard material or ceramic. The device according to the invention has an electronic control, which is programmed with a control program according to the invention. The control program contained in the electronic control is designed such that the previously described process can be carried out with it. The invention relates moreover to a method and a device, wherein the azimuthal distance of two adjacent cutting edges of the cutting tool and in particular the azimuthal distance of two cutting inserts following one another directly in the peripheral direction is greater than the azimuthal distance of two adjacent teeth of the gearwheel.

BRIEF DESCRIPTION OF THE DRAWINGS

Examples of embodiment of the invention are explained below with the aid of the appended drawings. They show.

DETAILED DESCRIPTION

Figure 1:
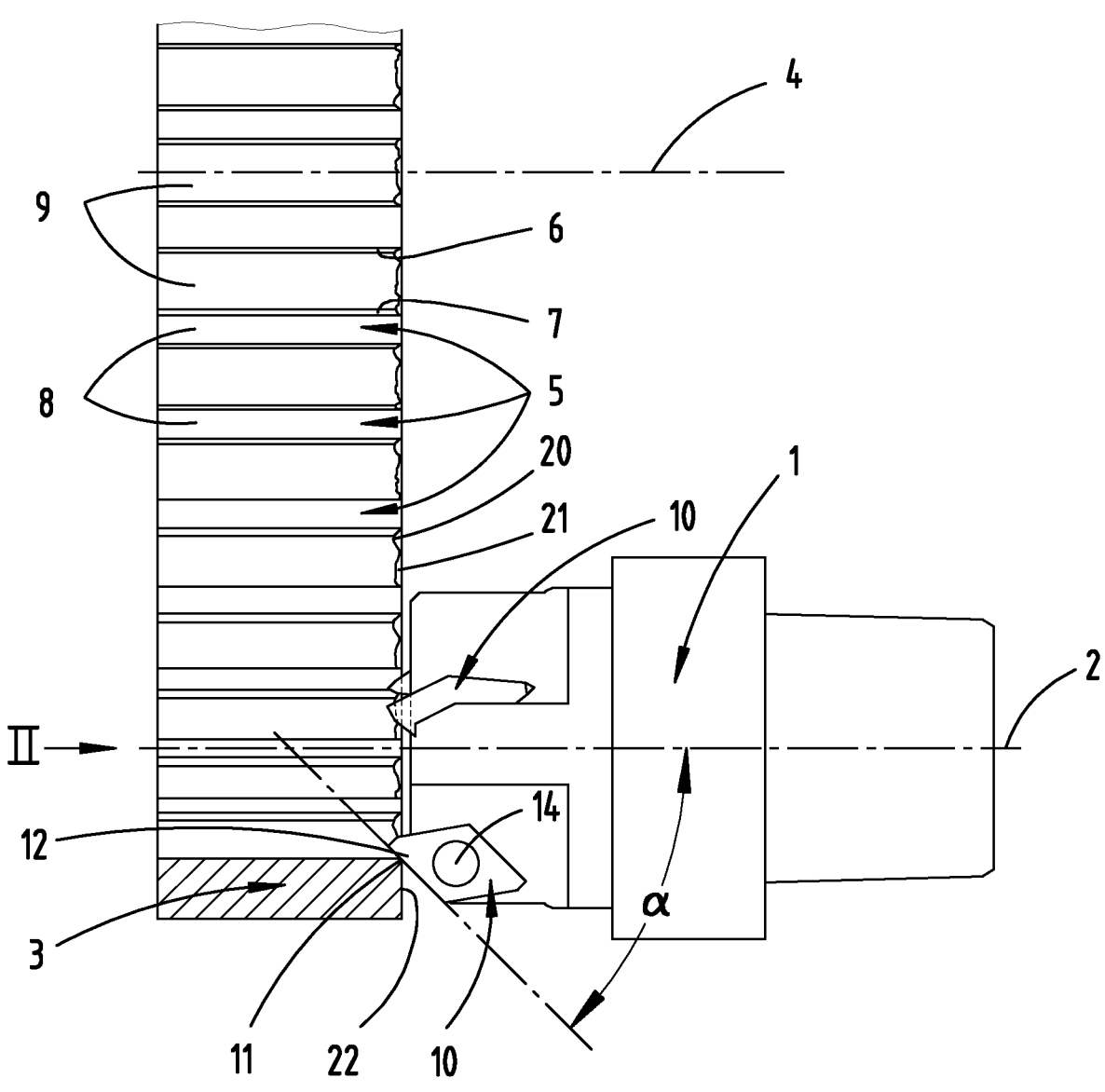
FIG. 1 In the manner of radial section, a gearwheel-shaped workpiece, which is deburred with a tool comprising cutting edges, FIG. 2 The view according to II in FIG. 1, FIG. 3 A first variant of a processing method, in which sections of an edge of tooth flanks are respectively processed in a plurality of successive processing steps, FIG. 4 A second variant of a processing method, in which the two flanks are each deburred with precisely one processing step, wherein the tooth base is processed in an intermediate step, FIG. 5 A first example of embodiment of an indexable cutting insert for performing the method in various views, FIG. 5a A side view of the indexable cutting insert is represented in FIG. 5, wherein the viewing direction corresponds to the extension direction of the cutting edge, FIG. 6 A cutting tool for performing the method, which is equipped with three indexable cutting inserts according to FIG. 5, FIG. 7 Enlarged in a perspective representation, the metal-removing ground section of an indexable cutting insert of an edge is processed, FIG. 8 A representation according to FIG. 5 of a second example of embodiment of an indexable cutting insert, FIG. 8a A side view according to FIG. 5a of the indexable cutting insert represented in FIG. 8, wherein the viewing direction corresponds to the extension direction of the cutting edge, FIG. 9 A cutting tool for performing the method, which is equipped with three indexable cutting inserts according to FIG. 8, FIG. 10 A representation according to FIG. 7, but with the use of an indexable cutting insert according to FIG. 8, FIG. 11 A perspective representation of the device during the performance of the method according to the invention, FIG. 12 Enlarged, detail XII in FIG. 11, FIG. 13 The axial view of a carrier of a total of five cutting inserts of a third example of embodiment of the invention and FIG. 14 The flank sections, which are processed after one another by the cutting inserts during a continuous rotational movement of the cutting tool about its rotation axis, which remains essentially fixed with respect to the rotation axis of the work gear during the processing.

With the method according to the invention, gearwheels toothed for example by gear skiving, gear hobbing or any other suitable method can be deburred. With the method, the edges at which flanks 6, 7 of teeth 5 of gearwheel 3 meet end face 22 of gearwheel 3 are deburred. A bevel is worked into this edge 20. Internally toothed and also externally toothed gearwheels can be deburred. In the example of embodiment, the deburring of an internally toothed gearwheel 3 is described.

With a tool spindle not represented, which can be driven in a rotary manner by an electric motor not represented and which comprises a chuck, which holds a tool 1, tool 1 is driven in a rotary manner about a tool rotation axis 2. With the workpiece spindle not represented, which is driven in a rotary manner by an electric motor not represented and which comprises a chuck, which carries a toothed work gear 3, work gear 3 is driven in a rotary manner about a workpiece rotation axis 4. With a control device not represented, which is programmable, the tool spindle is driven in a rotary manner about tool rotation axis 2 and the workpiece spindle is driven in a rotary manner about workpiece rotation axis 4 by means of the control program implemented there, such that cutting edges 11 of tool 1 move on a cycloid trajectory, wherein sections of the involuted trajectories run through sections of edge 20 to be deburred. By changing the phase position of the rotational movement of the tool spindle and the tool spindle and/or by changing the axial position of the both the spindles, the processing section, in which cutting edges 11 engage into edge 20 to be deburred, can move in the direction of the course of edge 20.

FIGS. 3 and 4 show the course of the involuted trajectories for the deburring of edge 20. In the example of embodiment represented in FIG. 3, edge 20 of a first tooth flank 6 is deburred with a plurality of processing steps carried out after one another, wherein first the edge of a first tooth flank 6, then the edge of tooth base 9 and then the edge of second tooth flank 7 are processed directly after one another. In the processing of edge 20 of tooth flank 6, the cutting direction follows the tooth tip down to the tooth base. In the processing of tooth flank 7 lying opposite tooth flank 6, the processing takes place with a cutting direction from the tooth base up to the tooth tip. In the example of embodiment represented in FIG. 4, the edges of tooth flanks 6, 7 are each processed with a single cut.

Figure 2:
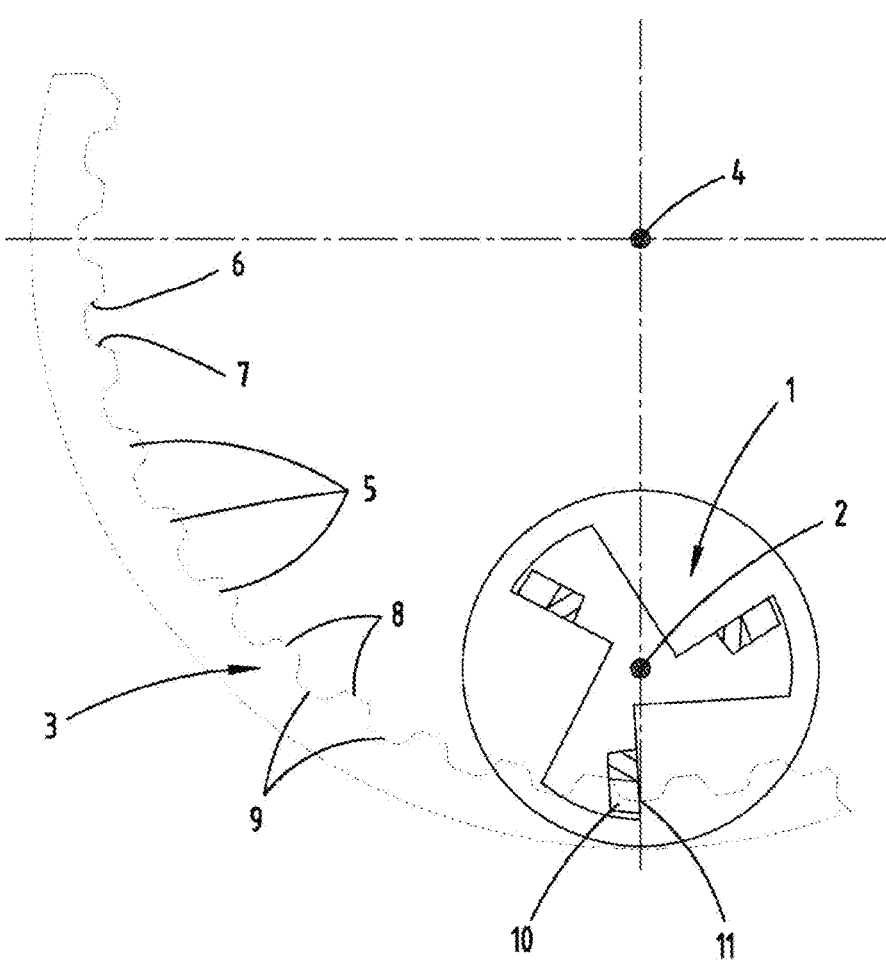
Figure 9:
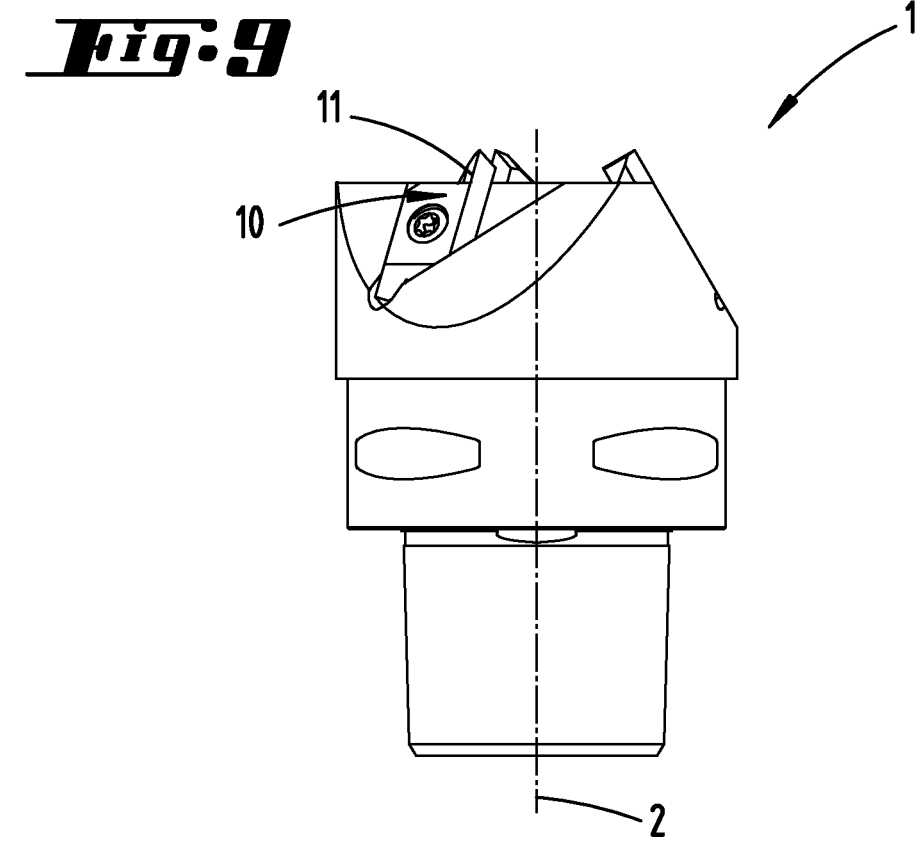
Figure 10:
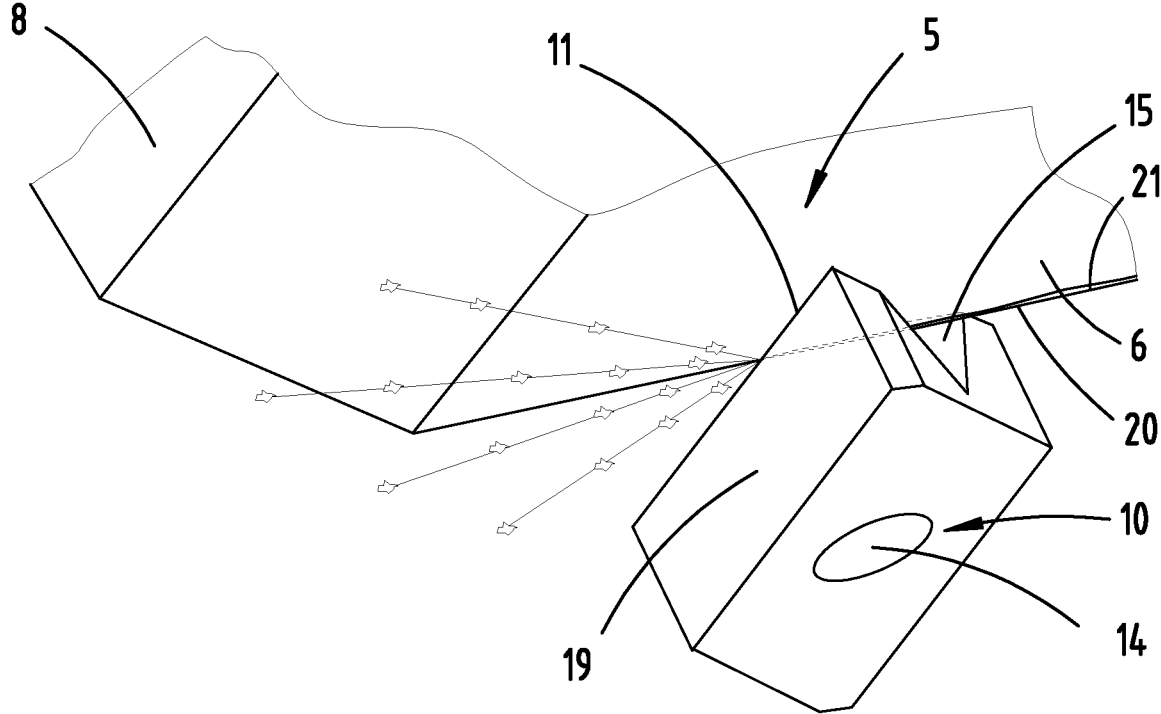

As can be seen from FIGS. 1 and 2, tool rotation axis 2 and workpiece rotation axis 4 lie in a common plane. They run parallel to one another. Cutting edges 11, which in the example of embodiment are each constituted by a cutting insert 10, run on a cone surface about tool rotation axis 2. Cutting edges 11 extend rectilinearly and run at an acute angle α to tool rotation axis 2, which lies between 30° and 60°. Cutting edges 11 can lie approximately in a radial plane relative to tool rotation axis 2. They can however also run slightly directionally offset with respect to such a radial plane.

According to a variant of the invention, provision is made such that, solely by a variation of the phase position and/or the axial position of tool rotation axis 2 and workpiece rotation axis 4, tooth flank 6, tooth base 9 and opposite-lying tooth flank 7 are successively deburred with the same cutting edge 11 in one process step without a change in the rotational direction. The cut through first tooth flank 7 takes place from tooth tip down to tooth base and through second tooth flank 7 from tooth base up to tooth tip. A cutting insert 10 which can be used for such a process is shown in FIGS. 5, 5a as well as 8 and 8a. FIGS. 6 and 7 or 9 and 10 show a measuring head provided with cutting insert 10 or in perspective the metal-removing ground section of cutting edge 11 of insert plate 10 on the workpiece. Cutting edge 11 forms a section of a marginal edge of a base body of cutting insert 10.

FIGS. 5, 5a show an indexable cutting insert 10 with a diamond-shaped outline. An acute-angled corner section of indexable cutting insert 10 forms in each case a cutting edge 11. A wide side face 23 of the cutting insert forms a cutting face 12. The base body of cutting insert 10 is ground in the corner section, so that ground section 15 arises. By means of the ground section, tool flank 13 is produced, which produces cutting edge 11 adjoining cutting face 12. Tool flank 13 and cutting face 12 have an angle α of approximately 50° to one another, so that a rake angle β of approximately 50° arises. The process described above can be carried out with such a small rake angle. The corner sections are blunted by grindings sections 17.

FIGS. 8, 8a show a second example of embodiment of an indexable cutting insert 10, which also comprises a grinding section 15, with which a tool flank 13 running at a rake angle β of approximately 50° to the cutting face 12 is produced. Cutting face 12 is formed here by an end face 19 of the base body of cutting insert 10. Here too, the corner sections are blunted by ground sections 17.

Figure 11:
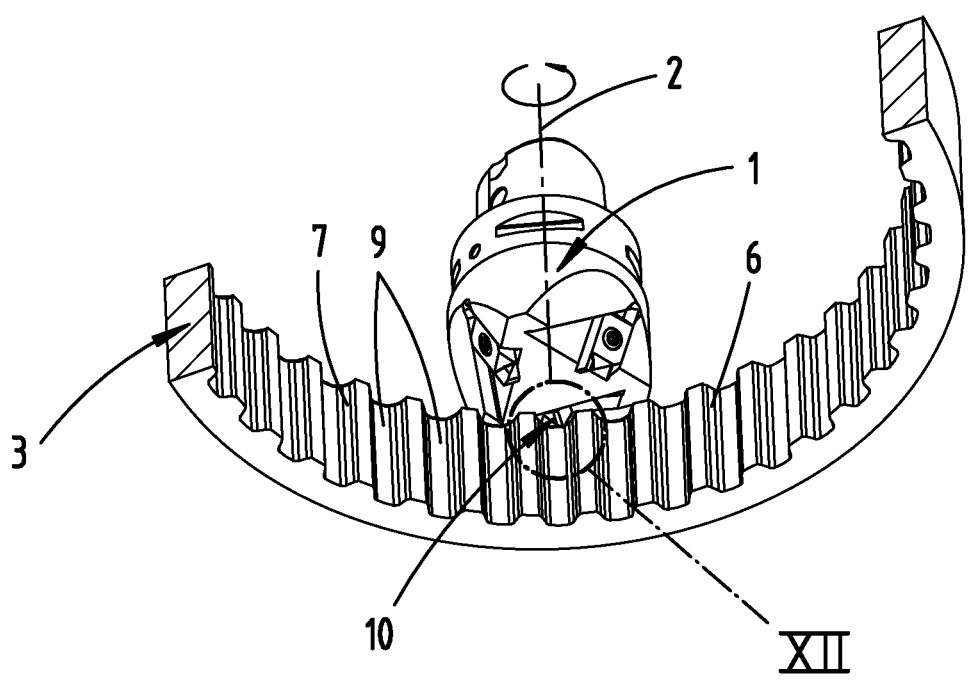
Figure 12:
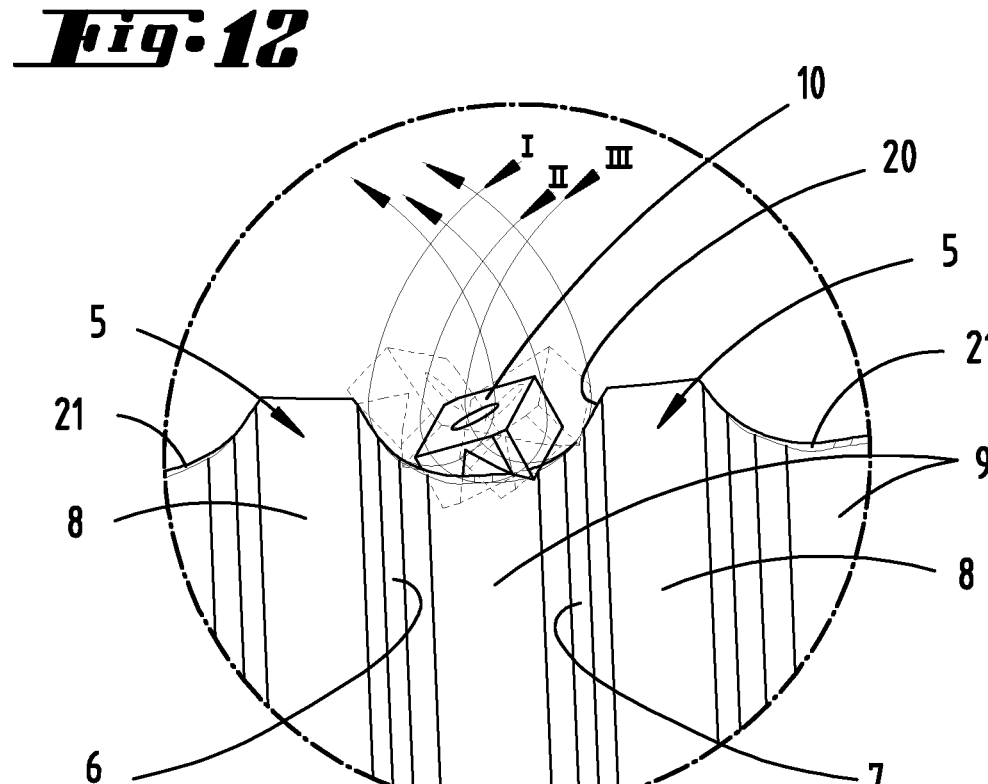

FIGS. 11 and 12 show the angle of attack of cutting face 12 changing during the processing of tooth flanks 6, 7 with respect to the direction of edge 20 to be processed. During the processing, edge 20 dips through the ground-free corner section of cutting insert 20.

Figure 13:
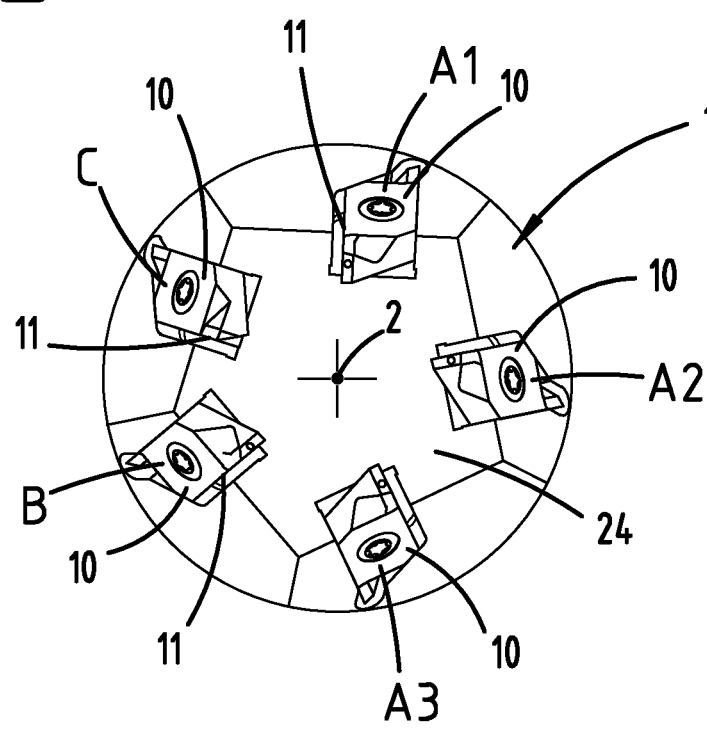
Figure 14:
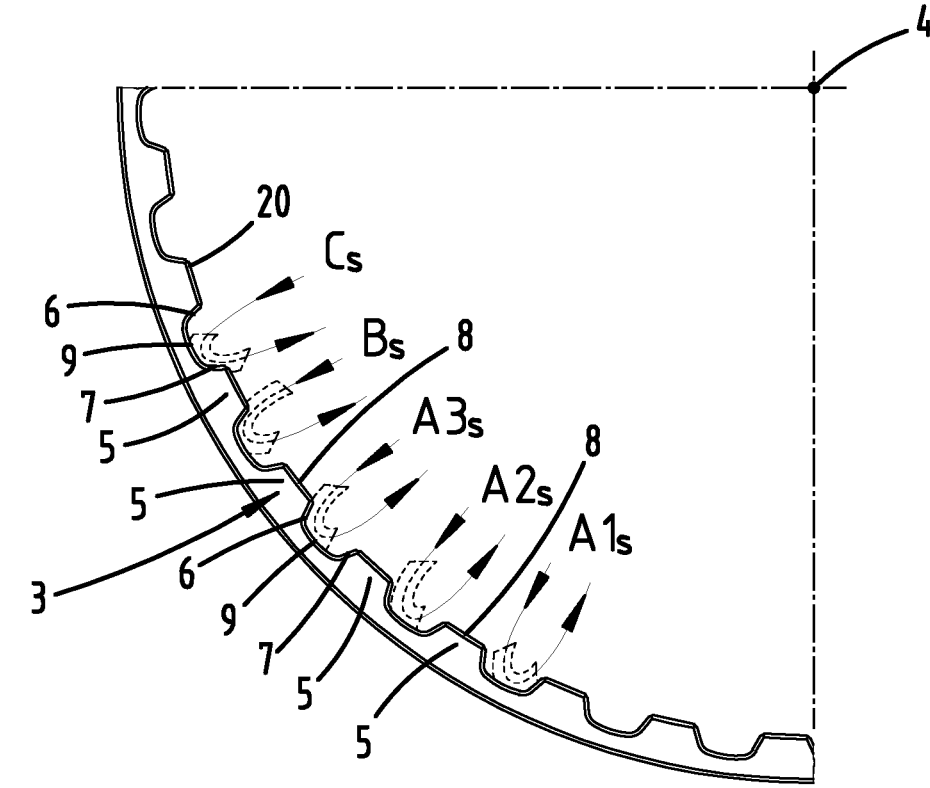

FIGS. 13 and 14 describe a variant of the previously described method and a variant of a previously described device for the performance of the method.

Cutting tool 1 is constituted by a carrier 24, which carries a plurality of cutting inserts 10. Carrier 24 can be driven in a rotary manner about a tool rotation axis 2. Cutting inserts 10 have different functions from one another. Cutting inserts A1, A2, A3, B, C are angularly offset about tool rotation axis 2, in such a way that, with a continuous synchronous rotation of cutting tool 1 about tool rotation axis 2 for the rotation of work gear 3 about workpiece rotation axis 4, they engage without changing the phase position at points of the teeth 5 of the work gear 3 which differ from one another. That, which with the method described previously is brought about by changing the phase position, brings about, in this example of embodiment of the invention, the angular offset of cutting inserts A1, A2, A3, B, C to peripheral positions arranged in a uniform angular distribution about rotation axis 2.

Cutting insert A1 is fastened to carrier 24, in such a way that it carries out first metal-removing processing at a first tooth on a first tooth flank section A1s.

Cutting insert A2 is fastened to carrier 24, in such a way that it carries out second metal-removing processing at a second tooth on a second tooth flank section A2s.

Cutting insert A3 is fastened to carrier 24, in such a way that it carries out third metal-removing processing at a third tooth on a third tooth flank section A3S.

Cutting insert B is a fastened to carrier 24, in such a way that it carries out fourth metal-removing processing at a fourth tooth on a fourth tooth flank section Bs.

Cutting insert C is a fastened to carrier 24, in such a way that it carries out fifth metal-removing processing at a fifth tooth on a fifth tooth flank section Cs. Cutting inserts A1, A2, A3, B, C each have a different angular distance from their closest neighbours.

It is proposed that the previously described first to fifth teeth are successively processed in one revolution and are different from one another. It is further proposed that the first to fifth tooth flank sections are processed successively in one revolution and are different from one another. It is further proposed that the first to fifth metal-removing processing operations are carried out immediately after one another on teeth different from one another, without the phase position of the rotational movements of the workpiece spindle and the tool spindle, which drive the workpiece and respectively the tool in a rotary manner, changing.

Provision can be made such that some of cutting inserts A1, A2 and A3 are designed the same as one another. Provision can further be made such that cutting inserts A1, A2, A3 differ by their design from other cutting inserts B, C. Provision can further be made such that the first to fifth tooth flank sections A1s, A2s, A3s, Bs, Cs overlap. Provision can further be made such that tooth flank sections A1s, A2s, A3s, Bs, Cs are assigned to different tooth flanks 6, 7 and/or tooth base 9. In the example of embodiment, tooth flank section Cs processed by cutting insert C extends over tooth flank 7 and in sections over tooth base 9. Tooth flank section Bs processed by cutting insert B extends over tooth flank 6 lying opposite tooth flank 7 and in sections over tooth base 9. Cutting inserts B, C are thus flank processing cutting inserts. They can be designed differently from one another. Tooth inserts A1, A2 and A3 can be designed the same as one another. They process flank sections A1s, A2s and A3s, which extend essentially along tooth base 9. At edges 20 of teeth 5, which extend from tooth tip 8 of a tooth 5 to tooth tip 8 of an adjacent tooth 5, bevels are produced successively with the cutting inserts in steps and in sections until the emergence of a bevel extending free from interruption from one tooth tip to the neighbouring tooth tip 8.

In FIG. 14, the tooth gaps or teeth, which are produced directly after one another with different cutting inserts A1 to C, are represented. This is also provided with a corresponding angle between two adjacent cutting inserts A1 to C. In a variant of the invention, in which the azimuthal distance between two adjacent cutting inserts A1 to C1 is greater than the azimuthal distance between adjacent teeth of the work gear, at least one tooth gap or tooth 5, which is first processed by a further revolution of work gear 3, lies between teeth 5 processed with cutting inserts A1 to C following one another directly on the azimuthal direction.

The invention thus relates in particular to a method and a device, wherein the azimuthal distance between adjacent cutting edges 11 is multiple times as great, in particular two times or three times as great, as the azimuthal distance between two adjacent teeth 5 of the work gear 3.

The aforementioned remarks serve to explain the inventions covered as a whole by the application, which develop the prior art at least by the following combinations of features in each case also independently, wherein two, more or all these combinations of features can also be combined, namely:

A method, which is characterised in that cutting edge 11 processes only one processing step of edge 20 during each revolution of cutting tool 1.

A method, characterised in that the processing sections of edge 20 are produced by different cutting edges 11 of cutting tool 1, which engage with teeth 5 of work gear 3 different from one another successively during a rotation of cutting tool 1 about its rotation axis 2.

A method, characterised in that cutting edges 11 are constituted by cutting inserts A1, A2, A3, B, C different from one another, which are assigned to the same cutting tool 1 and/or that cutting inserts A1, A2, A3, B, C, cutting edges 11 whereof engage at different points of edge 20, are arranged in an irregular angular position about tool rotation axis 2, and/or that cutting edges 11 of cutting inserts A1, A2, A3, B, C engage phase-shifted at edge (20).

A cutting tool, characterised in that at least some of cutting edges 11 of cutting inserts A1, A2, A3, B, C are arranged angularly offset with respect to one another, in such a way that, with the uniform synchronous rotation, they engage at points on teeth 5 of work gear 3 which are different from one another.

A method, which is characterised in that the processing section of edge 20 moves stepwise along edge 20 as a result of a change in the phase position of rotation of cutting tool 1 and rotation of gearwheel 3 and/or that edge 20 of a first tooth flank 7 is processed in a processing direction from tooth tip 8 to tooth base 9 and immediately thereafter the edge of a second tooth flank 8 lying opposite first tooth flank 7 is processed in a processing direction from tooth base 9 to tooth tip 8 and/or that cutting edge 11 is constituted by a cutting insert 10 and/or that cutting tool 1 has a plurality of cutting edges 11 arranged in a uniform peripheral distribution about rotation axis 2, which is constituted in particular by a cutting insert 10 in each case.

A method, which is characterised in that cutting edge 11 extending in particular rectilinearly runs at an angle α less than 90°, 80°, 60° or 50° and greater than 0°, 10°, 30° or 40° to the tool rotation axis 2.

A method, which is characterised in that cutting edge 11 is formed by a ground tool flank 13 and a cutting insert 10 formed by a side face 19.

A cutting insert 10, which is characterised in that cutting angle β is less than 70° or 60° and greater than 20°, 30° or 40°.

A cutting insert, which is characterised in that cutting edge 11 is constituted by a ground-free corner section of the base body, wherein provision is in particular made such that tool flank 13 is constituted by the cut-free corner section.

A device for performing the method, which is characterised in that rotation axes 2, 4 run parallel to one another and that the extension direction of cutting edge 11 has a component running in the radial direction relative to tool rotation axis 2.

A control program which, when executed on a control device of a device, controls the latter for the performance of a method according to any one of claims 1 to 7.

All the disclosed features are (in themselves, but also in combination with one another) essential to the invention. In the disclosure of the application, the disclosure contents of the associated/appended priority documents (preliminary application) are thus fully included, also for the purpose of incorporating features of these documents in claims of the present application. The sub-claims characterise, even without the features of a claim referred to, independent inventive developments of the prior art with their features, in particular in order to undertake divisional applications on the basis of these claims. The invention stated in each claim can include in addition one or more of the features stated in the aforementioned description, in particular provided with reference numbers and/or stated in the list of reference numbers. The invention also relates to design forms in which individual features stated in the above description are not implemented, in particular insofar as they are recognisably essential for the given intended use or can be replaced by other technical means acting in a similar manner.

The invention claimed is:

1. A method for producing a bevel on an edge of a gearwheel, wherein the gearwheel comprises at least one end face and teeth, wherein the teeth comprise flanks, defined by the end face of the gearwheel and the flanks of the teeth of the gearwheel adjacent to the end face with a cutting tool which at least comprises one cutting edge, wherein the gearwheel is driven in a rotary manner about a gearwheel rotation axis and the cutting tool is driven in a rotary manner about a cutting tool rotation axis in a predefined speed ratio, in such a way that the at least one cutting edge moves along a section of the edge removing material in an involute manner, wherein the gearwheel rotation axis of the gearwheel and the cutting tool rotation axis of the cutting tool run parallel to one another and wherein the at least one cutting edge comprises a direction of extension, wherein the direction of extension of the at least one cutting edge has a directional component running in a radial direction relative to the rotation axis of the cutting tool, wherein the at least one cutting edge processes only one processing section of the edge with each revolution of the cutting tool.

2. The method according to claim 1, wherein the processing sections of the edge are produced by different cutting edges of the cutting tool, which engage teeth of gearwheel different from one another successively during a rotation of cutting tool about the gearwheel rotation axis.

3. The method according to claim 2, wherein cutting edges are constituted by cutting inserts different from one another, which are assigned to the same cutting tool.

4. The method according to claim 3, wherein the cutting inserts, whose cutting edges engage the edge at different points, are arranged at irregular angular position about the tool rotation axis.

5. The method according to claim 1, wherein cutting edges are constituted by cutting inserts different from one another, which are assigned to the same cutting tool.

6. The method according to claim 5, wherein the cutting inserts, whose cutting edges engage the edge at different positions, are arranged at irregular angular position about the cutting tool rotation axis.

7. The method according to claim 1, wherein the processing section of the edge moves stepwise along the edge as a result of a change in a phase relationship between the rotation of the cutting tool and rotation of the gearwheel.

8. The method according to claim 1, wherein an edge of a first tooth flank is processed in a processing direction from a tooth tip to a tooth base and immediately thereafter an edge of a second tooth flank lying opposite the first tooth flank is processed in a processing direction from the tooth base to a tooth tip of the second tooth flank.

9. The method according to claim 1, wherein the at least one cutting edge is constituted by a cutting insert.

10. The method according to claim 1, wherein the cutting tool has a plurality of cutting edges arranged in a uniform peripheral distribution about the cutting tool rotation axis, each of which is formed by a cutting insert in each case.

* * * * *